(12) United States Patent
Domoto et al.

(10) Patent No.: US 11,329,443 B2
(45) Date of Patent: May 10, 2022

(54) LASER DEVICE

(71) Applicant: Panasonic Intellectual Property Management Co., Ltd., Osaka (JP)

(72) Inventors: Shinya Domoto, Osaka (JP); Naoya Kato, Osaka (JP); Ryo Ishikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 21 days.

(21) Appl. No.: 16/808,441

(22) Filed: Mar. 4, 2020

(65) Prior Publication Data
US 2020/0203910 A1 Jun. 25, 2020

Related U.S. Application Data

(63) Continuation of application No. PCT/JP2018/032950, filed on Sep. 6, 2018.

(30) Foreign Application Priority Data

Sep. 11, 2017 (JP) .............................. JP2017-174074

(51) Int. Cl.
| | |
|---|---|
| H01S 3/034 | (2006.01) |
| B23K 26/064 | (2014.01) |
| B23K 26/70 | (2014.01) |
| H01S 3/067 | (2006.01) |

(52) U.S. Cl.
CPC ............ *H01S 3/034* (2013.01); *B23K 26/064* (2015.10); *B23K 26/707* (2015.10); *H01S 3/067* (2013.01)

(58) Field of Classification Search
CPC ..... H01S 3/034; G02B 6/4225; G02B 6/4207; B23K 26/70; B23K 26/707

USPC ....................................................... 372/6, 99
See application file for complete search history.

(56) References Cited

U.S. PATENT DOCUMENTS

| | | | |
|---|---|---|---|
| 5,319,195 A | 6/1994 | Jones et al. | |
| 2004/0114935 A1* | 6/2004 | Fushimi ................. | G02B 6/262 398/141 |
| 2018/0026425 A1* | 1/2018 | Usuda ................... | H01S 5/0612 372/32 |

FOREIGN PATENT DOCUMENTS

| | | | |
|---|---|---|---|
| GB | 2294126 | * 10/1995 | ............... G02B 6/42 |
| GB | 2294126 | * 11/1995 | |
| GB | 2294126 | 4/1996 | |
| JP | 11-264921 | 9/1999 | |
| JP | 2004-151297 | 5/2004 | |

(Continued)

OTHER PUBLICATIONS

International Search Report of PCT application No. PCT/JP2018/032950 dated Nov. 27, 2018.

(Continued)

*Primary Examiner* — Tuan N Nguyen
(74) *Attorney, Agent, or Firm* — Wenderoth, Lind & Ponack, L.L.P.

(57) ABSTRACT

A laser device includes a laser oscillator that generates a laser beam, condenser lens that condenses laser beam emitted from the laser oscillator, transmission fiber that includes at least core that transmits laser beam condensed by condenser lens, and cladding provided around core, and a lens driving unit that adjusts a position of condenser lens. The lens driving unit automatically adjusts the position of condenser lens to reduce light intensity of laser beam incident on cladding.

4 Claims, 10 Drawing Sheets

(56) References Cited

FOREIGN PATENT DOCUMENTS

| | | |
|---|---|---|
| JP | 2008-044000 | 2/2008 |
| JP | 2012-091217 | 5/2012 |
| JP | 2016-112609 | 6/2016 |
| WO | 2016/152404 | 9/2016 |

OTHER PUBLICATIONS

Extended European Search Report dated Oct. 20, 2020 in related European Patent Application No. 18854119.7.

* cited by examiner

FIG. 5
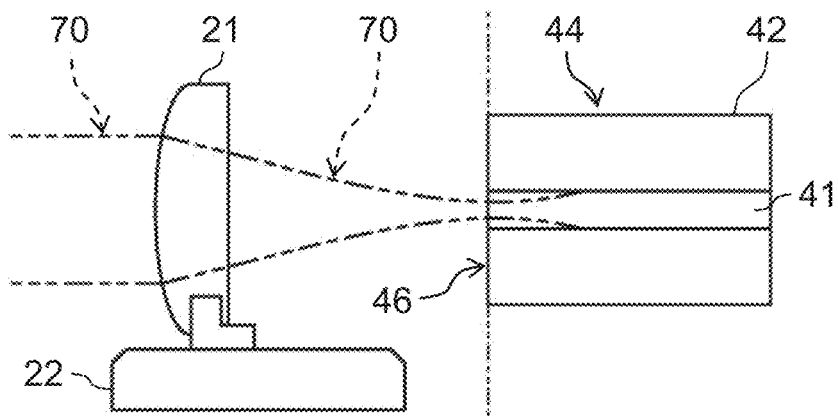
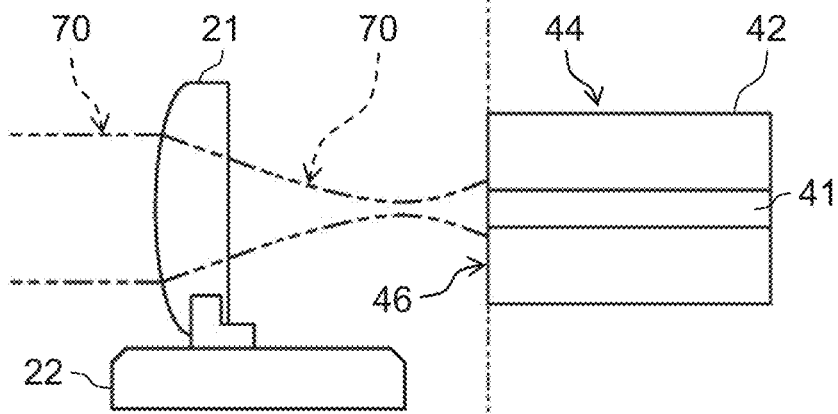
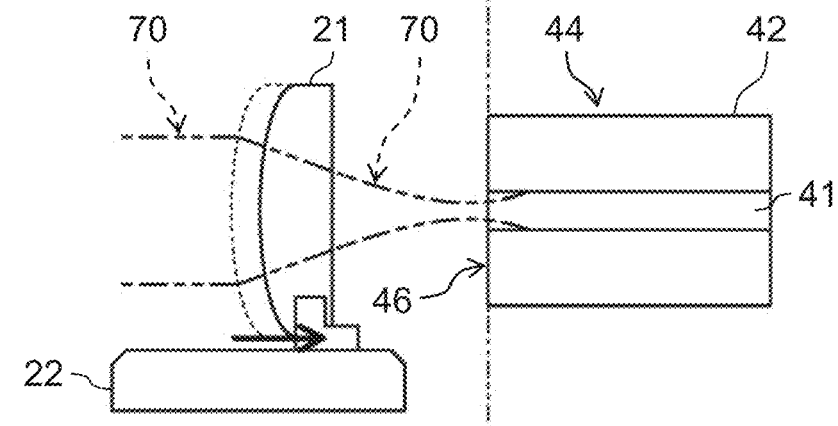
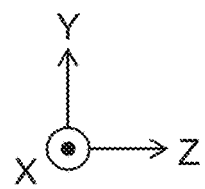

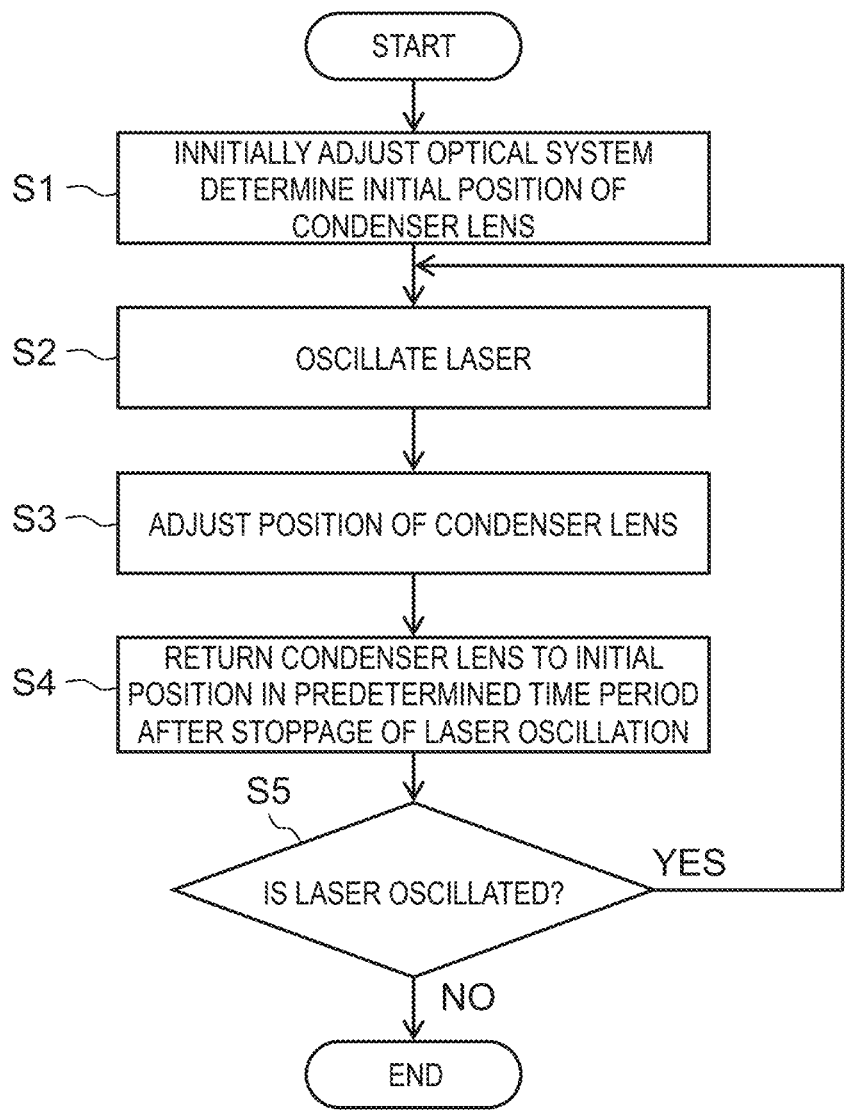

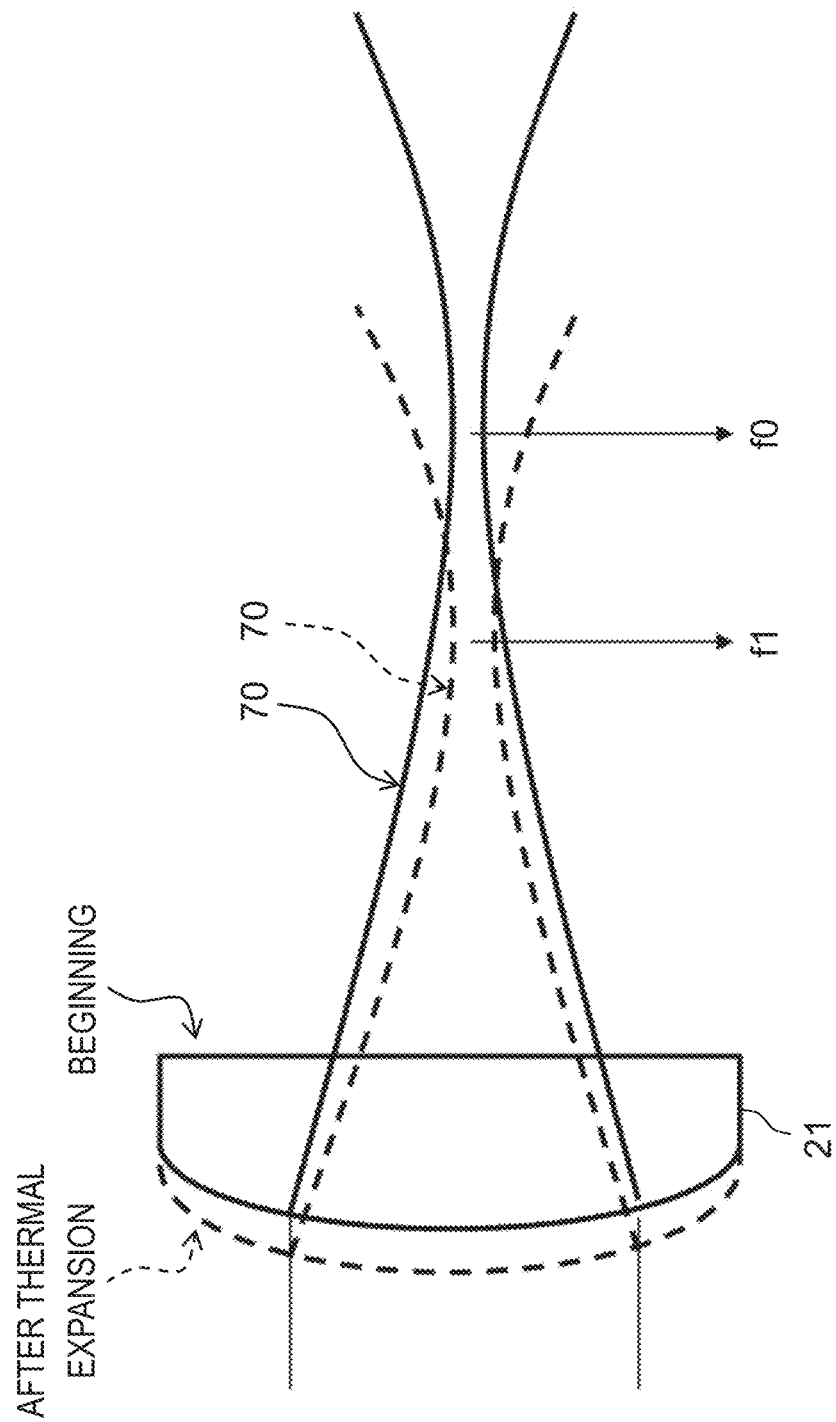

LASER DEVICE

TECHNICAL FIELD

The present disclosure relates to a laser device, and in particular, to a laser device that transmits a laser beam emitted from a laser oscillator to a transmission fiber using a condenser lens.

BACKGROUND ART

Recently, development of laser processing devices using direct diode laser (hereinafter, referred to as "DDL") has accelerated with higher output of the DDL. By synthesizing laser beams emitted from a plurality of laser modules, the DDL can yield high output exceeding several kW. A laser beam emitted from a beam synthesizer is transmitted to a processing head placed at a predetermined position via a transmission fiber. In this context, the laser beam emitted from the beam synthesizer is condensed by a condenser lens, and a condensed spot of the condensed laser beam is reduced to a size to fit in a core of the transmission fiber on a laser beam incident end face (hereinafter, simply referred to as "incident end face") of the transmission fiber to be incident on the transmission fiber (e.g., see PTL 1).

CITATION LIST

Patent Literature

PTL 1: WO 2016/152404

SUMMARY OF THE INVENTION

Technical Problem

Incidentally, a position of the condenser lens is adjusted such that the spot of laser beam is fitted in the core of the transmission fiber on the incident end face of the transmission fiber before the laser beam starts oscillating. However, the spot may fail to be fitted in the core of the transmission fiber because of misalignment of a focal position of the laser beam after the laser beam starts oscillating, increasing light intensity of light leaked in a cladding.

For example, when a laser beam is incident on an optical element such as a condenser lens, a phenomenon called thermal lens effect may occur. FIG. 10 is a schematic view illustrating a shift of a focal position of laser beam 70 due to the thermal lens effect. In FIG. 10, the focal position of laser beam 70 right after laser beam 70 is incident on condenser lens 21 shall be f0. When laser beam 70 continues to be incident on condenser lens 21, condenser lens 21 absorbs some of laser beam 70 and its temperature rises to be thermally expanded. This thermal expansion makes the focal position of laser beam 70 be shifted on a lens side, shifted to a position of f1 in this case. This phenomenon is the above-mentioned thermal lens effect. That is, laser beam 70 passed through condenser lens 21 has a focal position at a different position depending on thermal expansion of condenser lens 21.

However, in the above-mentioned conventional configuration, when there is no enough margin in a core diameter of the transmission fiber with respect to a spot diameter of the laser beam, light intensity of leak light in the transmission fiber, that is, light intensity of light that fails to fit in the core of the transmission fiber to be leaked to the cladding increases due to misalignment of the focal position of the laser beam. This increase in leak light may disadvantageously cause output drop of the laser beam transmitted by the transmission fiber or local heat generation near the incident end face of the transmission fiber. In particular, accumulation of damage due to heat generation may disadvantageously result in breakage of the transmission fiber.

The present disclosure has been conceived in light of such circumstances, and its object is to provide a laser device that reduces leak light in a transmission fiber in a laser device that transmits a laser beam to the transmission fiber using a condenser lens.

Solution to Problem

To achieve the above-mentioned object, a laser device according to an aspect of the present disclosure includes a laser oscillator that generates a laser beam, a condenser lens that condenses the laser beam emitted from the laser oscillator, a transmission fiber including at least a core that transmits the laser beam condensed by the condenser lens and a cladding provided around the core, and a lens driving unit that automatically adjusts a position of the condenser lens to reduce light intensity of the laser beam incident on the cladding.

Advantageous Effect of Invention

The present disclosure makes it possible to reduce leak light in a transmission fiber, that is, light intensity of a laser beam directly incident on a cladding of the transmission fiber.

BRIEF DESCRIPTION OF DRAWINGS

FIG. 5 is a schematic view illustrating a function to compensate a focal position shift of the laser beam by the lens driving unit.

FIG. 9 is a flowchart illustrating a position adjustment procedure of a condenser lens according to a second exemplary embodiment.

FIG. 10 is a schematic view illustrating a focal position shift of a laser beam due to thermal lens effect.

DESCRIPTION OF EMBODIMENTS

Hereinafter, exemplary embodiments of the present disclosure will be described in detail with reference to the drawings. The following description of preferred exemplary embodiments is merely illustrative in nature and is not intended to limit the present disclosure, application, or uses.

First Exemplary Embodiment

Configuration of Laser Device

Figure 1:
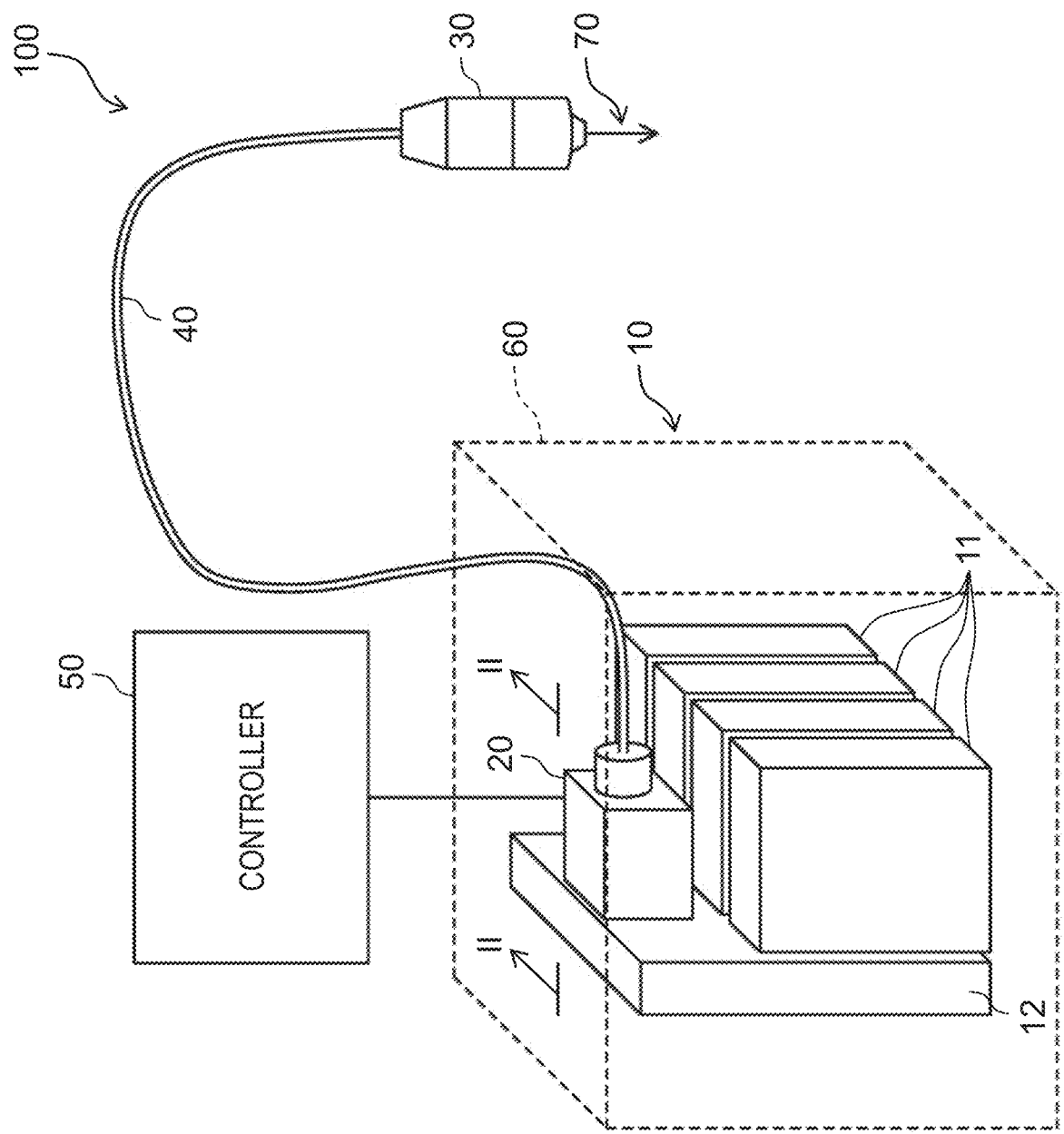
FIG. 1 is a diagram illustrating a configuration of a laser device according to a first exemplary embodiment.
Figure 2:
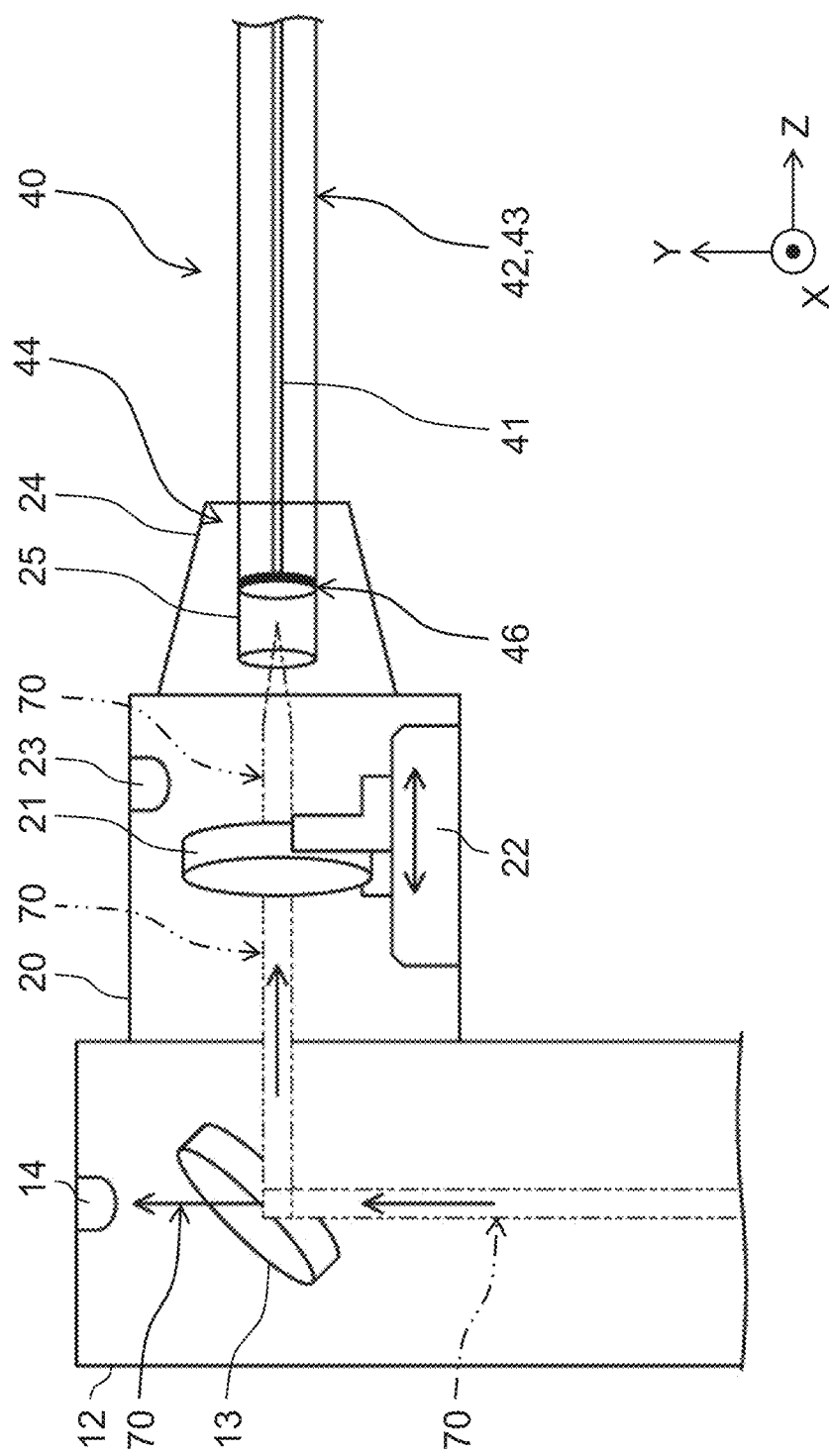
FIG. 2 is a cross-sectional schematic view along line II-II in FIG. 1.
Figure 3:
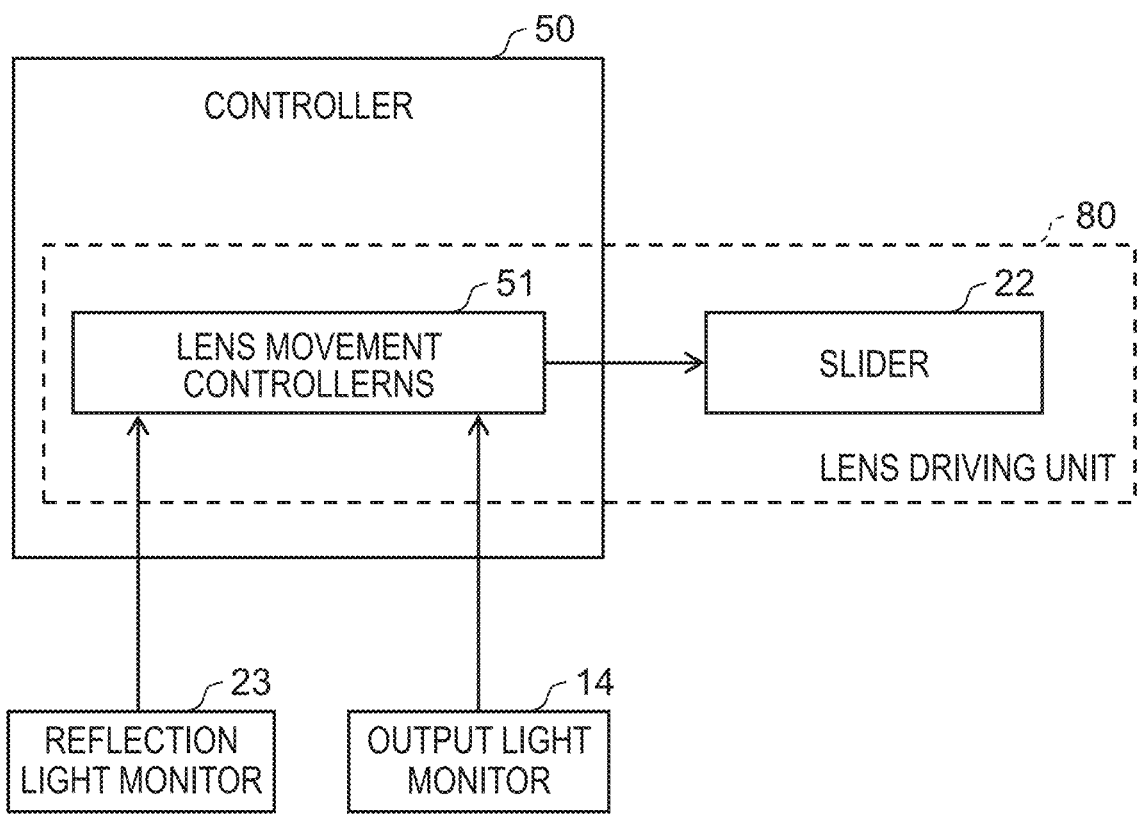
FIG. 3 is a functional block diagram of a lens driving unit.

FIG. 1 is a configuration diagram of laser device 100 according to the present exemplary embodiment. FIG. 2 is a cross sectional schematic view along line II-II in FIG. 1. FIG. 3 is a functional block diagram of lens driving unit 80. Note that, in the following description, a direction of laser beam 70 toward partially transmissive mirror 13 in FIG. 2 may be referred to as a Y direction, a direction of laser beam 70 from partially transmissive mirror 13 toward transmission fiber 40 may be referred to as a Z direction, and a direction perpendicular to the Y direction and the Z direction may be referred to as an X direction. Note that the Z direction matches an optical axis direction of laser beam 70 emitted from condenser lens unit 20 within a range of assembly tolerance of an optical system of laser device 100.

As illustrated in FIG. 1, laser device 100 includes laser oscillator 10, condenser lens unit 20, laser beam emission head 30, transmission fiber 40, and controller 50. Laser oscillator 10, condenser lens unit 20, and laser beam incident part 44 (see FIG. 2) of transmission fiber 40 are housed in housing 60.

Laser oscillator 10 includes a plurality of laser modules 11, and beam synthesizer 12. Laser oscillator 10 synthesizes laser beams having different wavelengths emitted from the respective plurality of laser modules 11 into one laser beam 70 by beam synthesizer 12. Note that, in the following description, laser oscillator 10 may be referred to as a DDL oscillator. Also, laser module 11 itself is formed of a plurality of laser diodes, and for example, formed of a semiconductor laser array.

As illustrated in FIG. 2, laser beam 70 wavelength-synthesized by beam synthesizer 12 is condensed by condenser lens 21 disposed in condenser lens unit 20, and incident on transmission fiber 40. Forming laser oscillator 10 to have such a configuration enables to obtain laser device 100 of high output whose laser beam output exceeds several kW. Beam synthesizer 12 also includes therein partially transmissive mirror 13 and output light monitor 14. Partially transmissive mirror 13 is configured to deflect laser beam 70 wavelength-synthesized in beam synthesizer 12 toward condenser lens unit 20 as well as transmits some, for example, 0.1% of laser beam 70. Output light monitor 14 is disposed in beam synthesizer 12 to receive laser beam 70 transmitted through partially transmissive mirror 13 and generate a detection signal corresponding to light intensity of laser beam 70 received. A function of output light monitor 14 will be described below. Also, laser oscillator 10 performs laser oscillation by being supplied with electric power from a power source device not shown in the drawings.

Condenser lens unit 20 includes therein condenser lens 21, slider 22, and reflection light monitor 23. Condenser lens 21 condenses laser beam 70 to make a spot diameter smaller than a core diameter of transmission fiber 40 on an incident end face 46 of transmission fiber 40. Slider 22 keeps condenser lens 21 so as to be freely movable in the Z direction depending on a control signal from controller 50. Slider 22 is coupled to a ball screw (not shown) driven by a motor (not shown), for example, and moves in the Z direction with rotation of the ball screw. Note that slider 22 mainly moves in the XY directions during initial position adjustment of the optical system, and moves along the Z direction during shift compensation of a focal position to be described below. When slider 22 moves in the XY directions, the movement may be performed manually or may be performed automatically. In a case of automatic movement, the above-mentioned ball screw and the like are coupled to slider 22. Reflection light monitor 23 receives laser beam 70 reflected or scattered by laser beam incident part 44 of transmission fiber 40, and generates a detection signal corresponding to light intensity of laser beam 70 received. A function of reflection light monitor 23 will be described below. Condenser lens unit 20 also includes connector 24, and laser beam incident part 44 of transmission fiber 40 is connected to connector 24. Connector 24 holds quartz block 25 provided in contact with incident end face 46 of transmission fiber 40. Quartz block 25 has a function to protect incident end face 46.

Transmission fiber 40 is optically coupled with condenser lens 21 of laser oscillator 10, and transmits laser beam 70 received from laser oscillator 10 via condenser lens 21 to laser beam emission head 30. Transmission fiber 40 includes core 41 that transmits laser beam 70, cladding 42 provided around core 41 and having a function to enclose laser beam 70 in core 41, and coating 43 covering a surface of cladding 42 (see FIG. 6). Also, mode stripper 45 (see FIG. 6) is provided on laser beam incident part 44 of transmission fiber 40, and details of mode stripper 45 will be described below. Although not illustrated in the drawings, mode stripper 45 is also provided on a laser beam emission part of transmission fiber 40.

Laser beam emission head 30 emits laser beam 70 transmitted by transmission fiber 40 externally. For example, when this laser device 100 is used for laser processing, laser beam 70 is emitted toward a work (not shown) disposed at a predetermined position.

Controller 50 controls laser oscillation of laser oscillator 10. Specifically, controller 50 controls laser oscillation by controlling output, on time, and the like with respect to a power source device (not shown) connected to laser oscillator 10. Also, as illustrated in FIG. 3, controller 50 includes lens movement controller 51. Upon receiving detection signals of reflection light monitor 23 and output light monitor 14, lens movement controller 51 moves slider 22 to make condenser lens 21 come to a predetermined position. Lens movement controller 51 and slider 22 form lens driving unit 80. Note that, when this laser device 100 is used for laser processing, controller 50 may control operation of a manipulator (not shown) to which laser beam emission head 30 is attached.

Shift Compensation of Optical Path and Focal Position of Laser Beam

Next, an optical path of laser beam 70 incident on transmission fiber 40 from laser oscillator 10, and a spot shape of laser beam 70 on incident end face 46 of transmission fiber 40 will be described. As illustrated in FIG. 2, laser beams emitted from the plurality of laser modules 11 are synthesized into one laser beam 70 by beam synthesizer 12, and thereafter reflected by partially transmissive mirror 13 provided in beam synthesizer 12 to be introduced to condenser lens 21 in condenser lens unit 20. Condenser lens 21 condenses laser beam 70 so as to have a spot diameter smaller than 100 µm on incident end face 46 of transmission fiber 40 in a case where the core diameter of transmission fiber 40 is 100 µm, for example. When Laser beam 70 condensed is passed through quartz block 25, and incident on core 41 of transmission fiber 40, laser beam 70 propagates in core 41 by total reflection, and is transmitted to the laser beam emission part (not shown) of transmission fiber 40. Herein, in order to enhance optical coupling efficiency between transmission fiber 40 and laser oscillator 10 to obtain laser beam 70 of high quality, laser beam 70 condensed by condenser lens 21 needs to be precisely incident in core 41 of transmission fiber 40. In other words, the spot diameter that is a diameter of spot 71 of laser beam 70 needs to be precisely fitted in the core diameter that is a diameter of core 41 of transmission fiber 40.

Figure 4A:
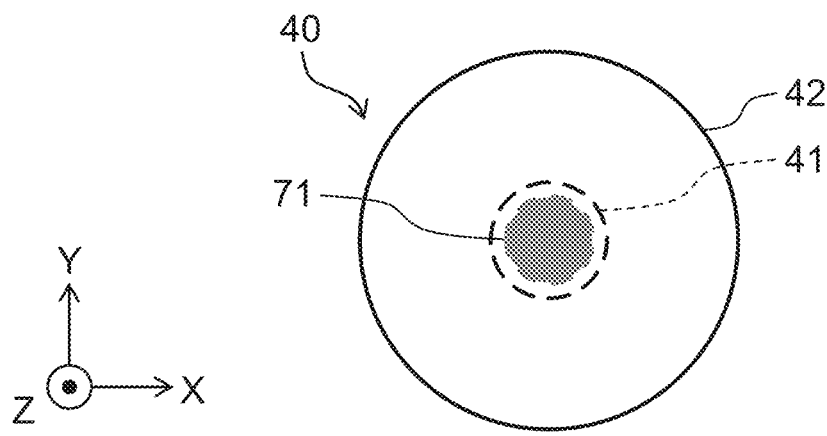
FIG. 4A is a schematic view illustrating an incident state of a laser beam on a laser beam incident end face of a transmission fiber.
Figure 4B:
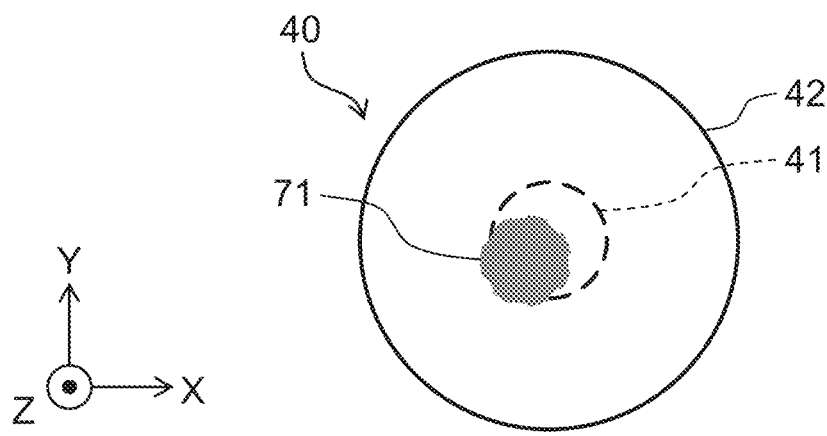
FIG. 4B is a schematic view illustrating another incident state of the laser beam on the laser beam incident end face of the transmission fiber.
Figure 4C:
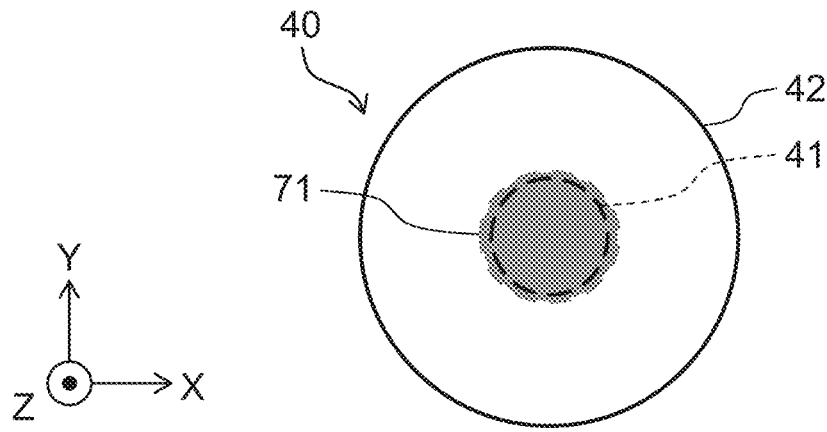
FIG. 4C is a schematic view illustrating a still another incident state of the laser beam on the laser beam incident end face of the transmission fiber.

FIG. 4A illustrates an incident state of the laser beam on incident end face 46 of transmission fiber 40, and illustrates an ideal state where laser beam 70 fits in core 41. FIG. 4B illustrates a state where a center of core 41 and the optical axis of laser beam 70 are misaligned and laser beam 70 is incident so as to be protruded in cladding 42. FIG. 4C illustrates a state where the spot diameter of laser beam 70 is larger than the core diameter of transmission fiber 40 and laser beam 70 is incident so as to be protruded in cladding 42.

In a state illustrated in FIG. 4A, a focal position of laser beam 70 substantially matches a center of core 41 of transmission fiber 40, and a diameter of spot 71 of laser beam 70 is equal to or less than the core diameter of transmission fiber 40. Also, in a state illustrated in FIG. 4B, as compared with a case illustrated in FIG. 4A, the focal position of laser beam 70 is misaligned in a surface parallel to incident end face 46 of transmission fiber 40, that is, in an XY plane, so that laser beam 70 is protruded from core 41. When laser beam 70 is emitted in such a state, laser beam 70 is incident on cladding 42, which may disadvantageously lower quality of laser beam 70 as well as damage transmission fiber 40. Accordingly, in this case, by adjusting the focal position of a focal lens by moving condenser lens 21 in the XY plane, laser beam 70 can be fitted in core 41.

In contrast, in a state illustrated in FIG. 4C, although the focal position of laser beam 70 substantially matches the center of core 41 of transmission fiber 40, the spot diameter of spot 71 of laser beam 70 is larger than the core diameter of core 41 of transmission fiber 40, resulting in a state where spot 71 is incident on cladding 42 so as to be protruded from core 41. This is a state where a distance from condenser lens 21 to incident end face 46 of transmission fiber 40 does not match a focal length of condenser lens 21.

Herein, a work for adjusting the position of condenser lens 21 is typically performed at a time when transmission fiber 40 is connected to condenser lens unit 20, and the position of condenser lens unit 21 is fixed when laser oscillation is performed. Also, such a state illustrated in FIG. 4B is typically eliminated by this initial adjustment.

However, as described above, in an optical component such as condenser lens 21, thermal lens effect occurs by temperature rise due to laser oscillation. Accordingly, the focal position of laser beam 70 continues to shift until size or the like of each optical component thermally saturates from immediately after laser oscillation. In this case, the focal position shifts in the Z direction. Accordingly, even when the position of condenser lens 21 is adjusted before laser oscillation to provide the state illustrated in FIG. 4A, the spot diameter of spot 71 of laser beam 70 on incident end face 46 of transmission fiber 40 may disadvantageously become the state illustrated in FIG. 4C due to heat generation during laser oscillation, failing to fit in the core diameter of core 41 of transmission fiber 40 to increase leak light.

Therefore, as illustrated in FIGS. 2, 3, in the exemplary embodiment, slider 22 capable of moving in the Z direction while holding condenser lens 21 is provided in condenser lens unit 20. Furthermore, condenser lens 21 is moved by lens driving unit 80 formed of slider 22 and lens movement controller 51 to compensate a focal position shift of laser beam 70.

FIG. 5 is a schematic view illustrating a function to compensate the focal position shift of laser beam 70 by lens driving unit 80. Alignment of transmission fiber 40 and initial adjustment of the optical system are performed, so that the optical axis of laser beam 70 passed through condenser lens 21 and a center axis of core 41 of transmission fiber 40 match each other within a range of assembly tolerance.

As illustrated in part (a) on an upper side of FIG. 5, at a beginning of laser oscillation, the focal position of laser beam 70 is adjusted such that the spot diameter of laser beam 70 becomes smaller than the core diameter of transmission fiber 40 on incident end face 46 of transmission fiber 40. In contrast, when laser oscillation continues, as illustrated in part (b) in a middle of FIG. 5, the focal position of laser beam 70 shifts on a side of condenser lens 21 due to the thermal lens effect, so that the spot diameter of laser beam 70 becomes large than the core diameter of transmission fiber 40. Accordingly, as illustrated in part (c) on a lower side of FIG. 5, in laser device 100 according to the present exemplary embodiment, lens driving unit 80 makes the position of condenser lens 21 come close to the side of transmission fiber 40 in the Z direction to compensate this shift. This adjusts the focal position of laser beam 70 to make the spot diameter of laser beam 70 becomes smaller than the core diameter of transmission fiber 40 again.

Also, when condenser lens 21 is moved in the Z direction, reflection light monitor 23 is provided near laser beam incident part 44 of transmission fiber 40, and lens driving unit 80 determines moving direction of condenser lens 21, that is, whether condenser lens 21 is moved on a side of laser oscillator 10 or a side of transmission fiber 40 in the Z direction is determined, as well as determines a moving amount of condenser lens 21 on the basis of a detection signal of reflection light monitor 23.

Figure 6:
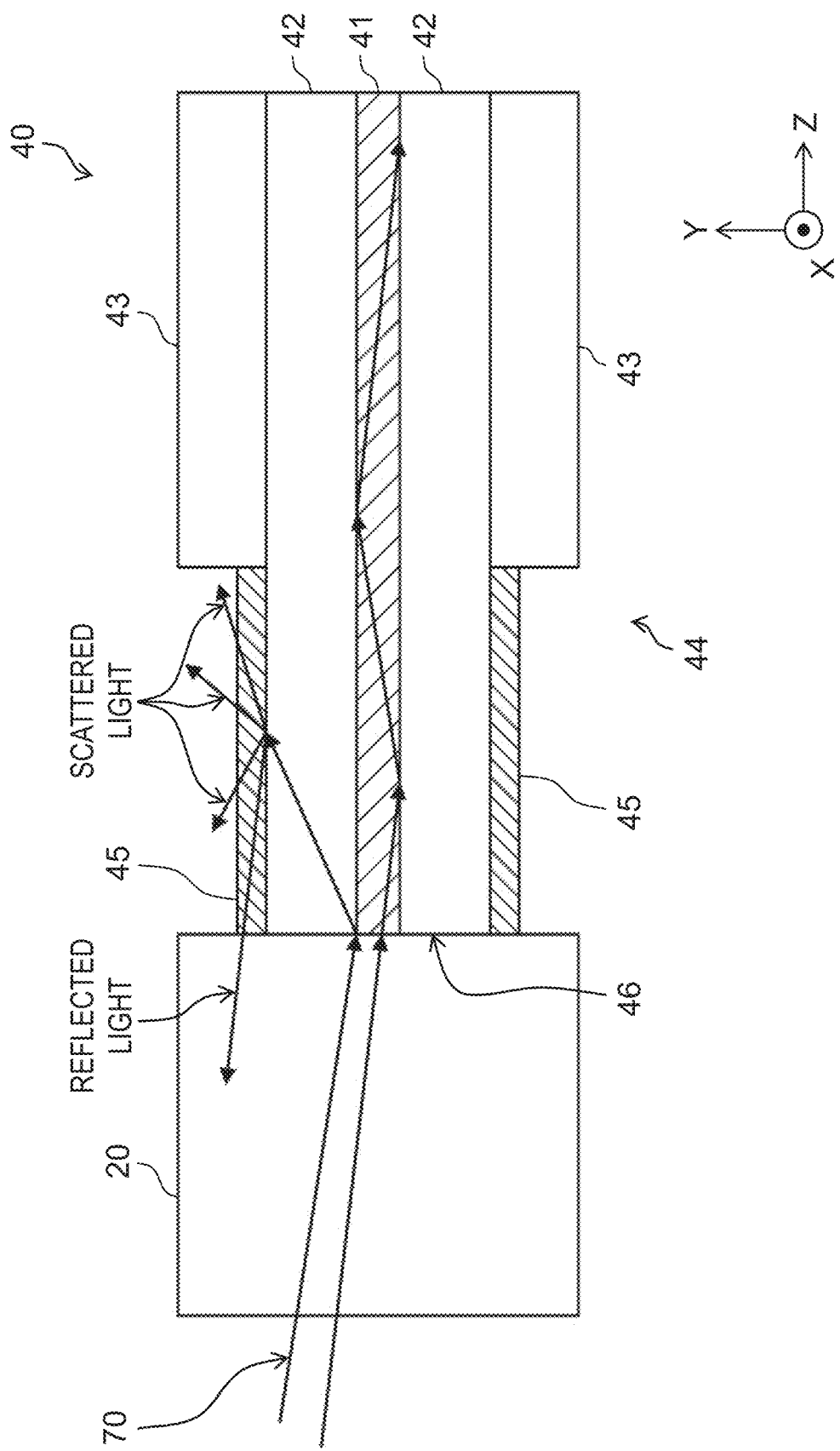
FIG. 6 is a schematic cross-sectional view near a laser beam incident part of the transmission fiber.
Figure 7:
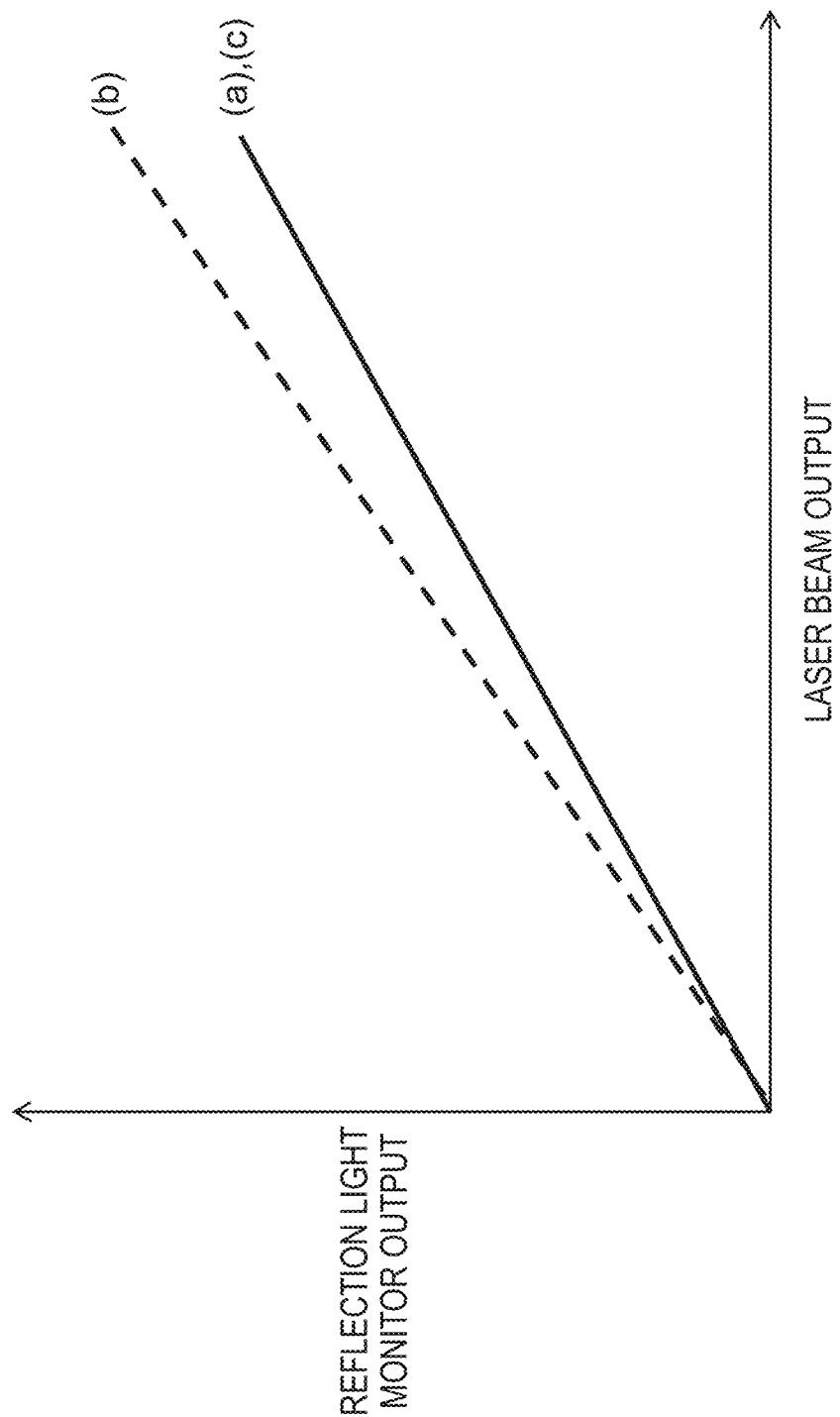
FIG. 7 is a diagram illustrating a relation between laser beam output and a detection signal of a reflection light monitor.

FIG. 6 is a schematic cross-sectional view near laser beam incident part 44 of transmission fiber 40. FIG. 7 is a diagram illustrating a relation between output of laser beam 70 and the detection signal of reflection light monitor 23. Note that (a) to (c) illustrated in FIG. 7 respectively correspond to parts (a) to (c) illustrated in FIG. 5.

Herein, a function of reflection light monitor 23 will be described. As illustrated in FIG. 6, typical transmission fiber 40 includes mode stripper 45 at each of a vicinity of laser beam incident part 44 and a vicinity of an emission part. Mode stripper 45 is a mechanism for removing leak light that does not propagate in core 41 to be incident on cladding 42 among laser beams 70 incident on transmission fiber 40. When there is no mode stripper 45, laser beam 70 incident on cladding 42 propagates in cladding 42, so that laser beam 70 of low quality is disadvantageously emitted from the laser beam emission part of transmission fiber 40. Although a detailed mechanism of mode stripper 45 differs between manufactures that manufacture transmission fiber 40, mode stripper 45 is of converting light incident on cladding 42 into heat without totally reflecting the light for removal, and in this context, some of light incident on cladding 42 is scattered or reflected.

In the present exemplary embodiment, reflection light monitor 23 is disposed to detect light scattered or reflected by mode stripper 45 in condenser lens unit 20 to which transmission fiber 40 is connected. When light scattered or reflected by mode stripper 45 is detected by reflection light monitor 23, a detection signal corresponding to light intensity detected is generated. Then, as illustrated in FIG. 3, the detection signal in reflection light monitor 23 is input to lens movement controller 51, and the moving direction and moving amount of slider 22 are calculated by lens movement controller 51. A control signal is supplied to slider 22 from lens movement controller 51 on the basis of this calculation result to move slider 22 so that condenser lens 21 comes to a predetermined position. Note that lens movement controller 51 need not necessarily be formed by a dedicated electronic circuit or a large-scale integration (LSI), and may be a function block provided by performing software on hardware such as a general-purpose central processing unit (CPU).

Making lens driving unit 80 move condenser lens 21 such that the detection signal of reflection light monitor 23 becomes less than or equal to a predetermined value compensates the shift of the focal position of laser beam 70, reducing leak light in transmission fiber 40, that is, light intensity of laser beam 70 directly incident on cladding 42. This also makes it possible to fit laser beam 70 condensed by condenser lens 21 in core 41 on incident end face 46 of transmission fiber 40.

Herein, as illustrated in FIG. 7, reflection light monitor 23 outputs a signal proportional to laser oscillation output of laser oscillator 10 even when there is no leak light that does not fit in core 41 of transmission fiber 40. This is because various optical components are arranged on the optical path of laser beam 70, for example, quartz block 25 is positioned at a connecting portion between condenser lens unit 20 and transmission fiber 40, to inevitably generate reflected light on each boundary surface. Accordingly, to precisely monitor light intensity of leak light in transmission fiber 40, a signal proportional to the laser oscillation output needs to be subtracted.

A signal proportional to laser oscillation output of laser oscillator 10 can be calculated also from an oscillation command value sent to laser oscillator 10 from controller 50. However, for example, when output drop due to aging of laser module 11 or the like occurs, precise monitoring becomes impossible.

Therefore, in the present exemplary embodiment, above-mentioned output light monitor 14 is provided in beam synthesizer 12 besides reflection light monitor 23 to calculate an actual output of laser beam 70 on the basis of the detection signal. When some of laser beam 70 transmitted through partially transmissive mirror 13 is detected by output light monitor 14, a detection signal corresponding to light intensity detected is generated. The detection signal in output light monitor 14 is input to lens movement controller 51 like the detection signal in reflection light monitor 23, and an actual output value of laser beam 70 is calculated by lens movement controller 51 on the basis of the detection signal. A value of reflection light monitor 23 output at this actual output value is calculated from the actual output value of laser beam 70 calculated (see FIG. 7), and the output value of reflection light monitor 23 calculated is subtracted from a value corresponding to the detection signal of reflection light monitor 23 to thereby generate a differential signal corresponding to light intensity of leak light in transmission fiber 40. A control signal to control movement of slider 22 holding condenser lens 21 is generated on the basis of the differential signal.

Figure 8:
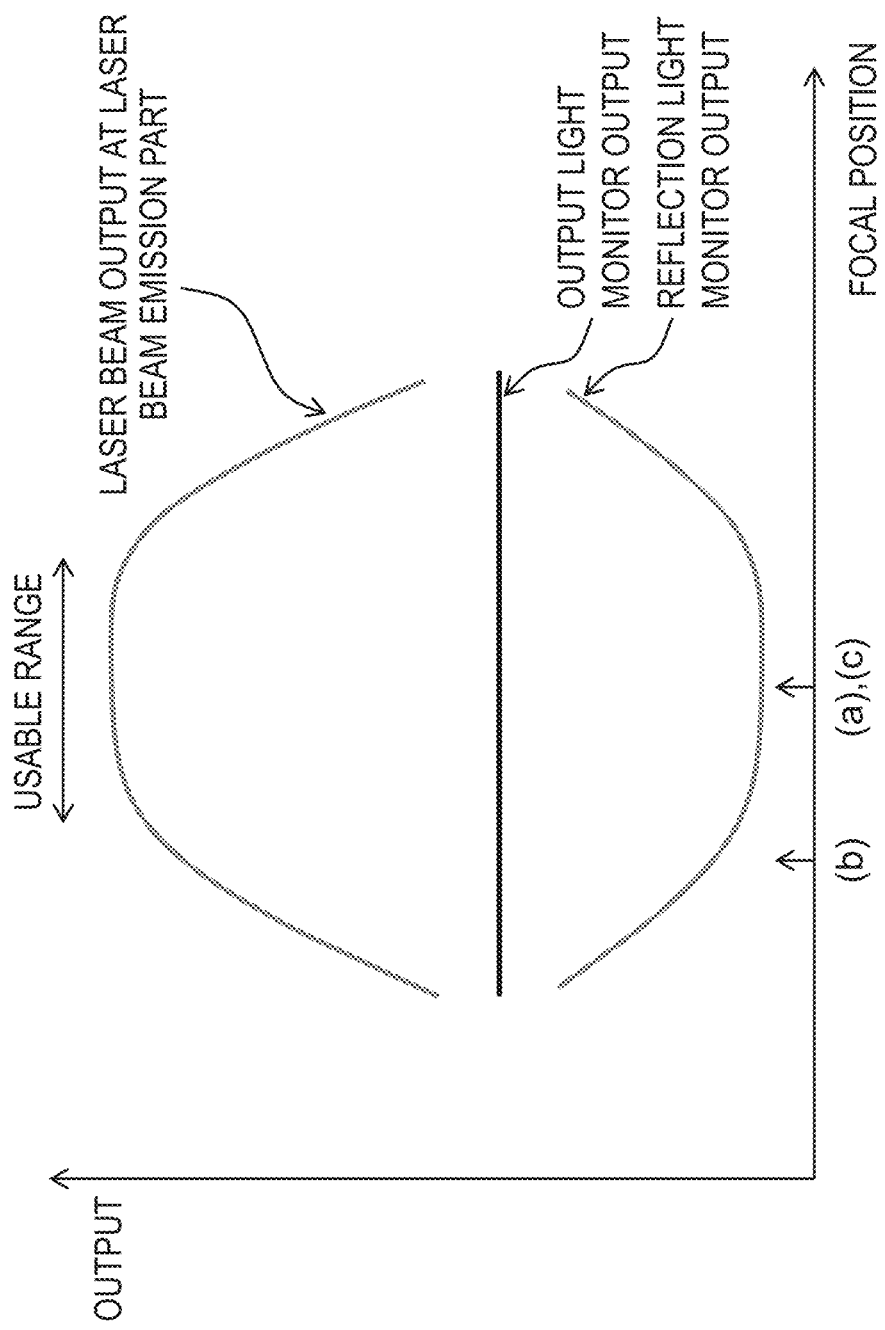
FIG. 8 is a diagram illustrating behaviors of the detection signal of the reflection light monitor, a detection signal of an output light monitor, and the laser beam output versus a focal position of a laser beam passed through a condenser lens.

FIG. 8 illustrates behaviors of the detection signal of reflection light monitor 23, the detection signal of output light monitor 14, and output of laser beam 70 emitted from transmission fiber 40 with respect to the focal position of laser beam 70 after passed through condenser lens 21. Note that (a) to (c) illustrated in FIG. 8 respectively correspond to parts (a) to (c) illustrated in FIG. 5.

When the focal position of laser beam 70 exists near incident end face 46 of transmission fiber 40, output of laser beam 70 emitted from transmission fiber 40 becomes a maximum value. When the spot diameter of laser beam 70 has an enough room with respect to the core diameter of transmission fiber 40, a range of the focal position providing the maximum value, that is, a usable range of laser device 100 expands. ((a) of FIG. 8). However, when the focal position is misaligned and, for example, the spot diameter of laser beam 70 becomes large, leak light in transmission fiber 40 increases, lowering output of laser beam 70 emitted from transmission fiber 40 ((b) of FIG. 8).

Herein, when the focal position of laser beam 70 is shifted to increase leak light with respect to transmission fiber 40 when laser beam 70 enters transmission fiber 40 on laser beam incident part 44 of transmission fiber 40, the detection signal of reflection light monitor 23 provided on a later stage of condenser lens 21 increases with an increase in scattered light scattered by mode stripper 45 existing in laser beam incident part 44 of transmission fiber 40. Note that, the detection signal of output light monitor 14 reflects output of laser beam 70 detected by spectroscopy before entered in condenser lens 21 in a previous state of condenser lens 21. Accordingly, the detection signal of output light motor 14 does not depend on the thermal lens effect occurred in condenser lens 21.

Accordingly, the difference signal obtained based on the detection signal of reflection light monitor 23 and the detection signal by output light monitor 14 is proportional to light intensity of light scattered or reflected by mode stripper 45. Moving condenser lens 21 such that the differential signal becomes less than or equal to a predetermined value enables to surely reduce leak light in transmission fiber 40 associated with the shift of the focal position of laser beam 70. This enables to suppress damage of incident end face 46 of transmission fiber 40 and increase optical coupling efficiency between laser oscillator 10 and transmission fiber 40 to suppress lowering of laser beam output.

Specifically, when a DDL oscillator using a laser diode is used as laser oscillator 10, an emission beam shape from the laser diode is oblong. Accordingly, the spot shape of laser beam 70 waveform-synthesized by beam synthesizer 12 is hard to be a circle shape and the spot shape can be a shape having a corner. In this case, leak light protruded from core 41 to be leaked into cladding 42 is emitted to a specific position of mode stripper 45 in a concentrated manner, readily casing local heat generation at this position of mode stripper 45 to readily cause damage of transmission fiber 40.

The present exemplary embodiment makes it possible to reduce leak light in transmission fiber 40 by adjusting the position of condenser lens 21 to modify the focal position of laser beam 70 also in the above-mentioned case. This enables to suppress damage of transmission fiber 40 and suppress output lowering of laser beam 70.

Effects and Others

As described above, it is preferable to further include the reflection light monitor that detects light intensity including light intensity of laser beam reflected or scattered at the laser beam incident part when the laser beam is incident on the laser beam incident part of the transmission fiber, and the lens driving unit preferably adjusts the position of the condenser lens to reduce light intensity detected by the reflection light monitor.

This configuration makes the reflection light monitor detect light intensity including reflected light or scattered light due to leak light from the transmission fiber, and the position of the condenser lens be adjusted to reduce light intensity detected, making it possible to reduce leak light in the transmission fiber.

Light intensity detected by the reflection light monitor includes light intensity detected in proportional to output of laser beam emitted from the laser oscillator. It is preferable that an output light monitor that detects light intensity of some of laser beam emitted from the laser oscillator is further included, and the lens driving unit calculates light intensity detected in proportional to output of laser beam emitted from the laser oscillator on the basis of light intensity detected by the output light monitor and adjusts the position of the condenser lens to reduce light intensity obtained by subtracting the light intensity calculated from light intensity detected by the reflection light monitor.

This configuration enables to surely calculate light intensity of leak light by calculating a component that does not depend on leak light included in light intensity detected by the reflection light monitor using light intensity detected by the output light monitor, making it possible to surely reduce leak light in transmission fiber.

The lens driving unit preferably adjusts the position of the condenser lens to compensate the shift of the focal position of laser beam due to the thermal lens effect due to temperature rise in the laser device.

This configuration enables to suppress impact of the thermal lens effect generated in the laser device to reduce leak light in the transmission fiber.

The laser oscillator preferably includes a plurality of laser modules that emits laser beams having different wavelengths with each other, and a beam synthesizer that wavelength-synthesizes the plurality of laser beams different in wavelength with each other emitted from the plurality of laser modules to emit them as one laser beam.

This configuration makes it possible to provide a laser device of high output.

Second Exemplary Embodiment

Laser device 100 according to the present exemplary embodiment basically has the same configuration as the configuration illustrated in the first exemplary embodiment, and a mode of movement control of condenser lens 21 during laser oscillation is different.

FIG. 9 illustrates a position adjustment procedure of condenser lens 21 according to the present exemplary embodiment. First, initial adjustment of the optical system such as the position of condenser lens 21 is performed before laser processing. Specifically, laser oscillation is performed by laser oscillator 10 to generate laser beam 70, and condenser lens 21 is moved by lens driving unit 80 to adjust the position of condenser lens 21 to determine an initial position of condenser lens 21 (step S1). In this case, laser oscillation time is adjusted such that exothermic temperature of condenser lens 21 due to laser beam 70 becomes less than or equal to a predetermined value. Also, in step S1, as illustrated in FIG. 4A, the position of condenser lens 21 is adjusted such that the optical axis of laser beam 70 is substantially positioned at a center of core 41 of transmission fiber 40, and the spot diameter of laser beam 70 becomes less than or equal to the core diameter of transmission fiber 40. Laser oscillation is stopped after the initial adjustment.

Next, laser oscillation is performed by laser oscillator 10 to generate laser beam 70 (step S2). In this state, when laser oscillation is continued, condenser lens 21 generates heat by absorbing some of laser beam 70, causing the above-mentioned thermal lens effect to change a curvature of condenser lens 21. This shifts the focal position of laser beam 70 such that spot 71 of laser beam 70 is protruded from core 41 as illustrated in FIG. 4B. A shift amount of the focal position is calculated on the basis of the detection signal of reflection light monitor 23 and the detection signal of output light monitor 14, and condenser lens 21 is moved in the Z direction by lens driving unit 80, that is, condenser lens 21 is moved along the traveling direction of laser beam 70 such that the shift amount becomes less than or equal to a predetermined value (step S3).

Next, when laser oscillation by laser oscillator 10 is stopped, absorbing of laser beam 70 by condenser lens 21 is lost, cooling condenser lens 21 to drop its temperature. As a result, the thermal lens effect becomes small, restoring the curvature of condenser lens 21 to make the shift of the focal position be returned. Supposing that it takes a predetermined time period, for example, five seconds for temperature of condenser lens 21 to return, lens driving unit 80 moves condenser lens 21 to the initial position in step S1 in five seconds (step S4). Note that the predetermined time period is predicted on the basis of temperature drop characteristics preliminarily obtained of condenser lens 21 with respect to time.

Whether laser oscillation is performed again by laser oscillator 10 is confirmed (step S5), and when laser oscillation is performed, steps S2 to S4 are repeated, and when laser oscillation is not performed, the flow is ended.

As described above, according to the present exemplary embodiment, when laser oscillator 10 intermittently repeats laser oscillation, in other words, during intermittent oscillation period, temperature drop time of condenser lens 21 is predicted to adjust the position of condenser lens 21 with the prediction, making it possible to compensate the shift of the focal position of laser beam 70. This enables to reduce leak light in transmission fiber 40 through intermittent oscillation period during which thermal expansion and contraction of the condenser lens 21 are repeated. This also enables to suppress damage of incident end face 46 of transmission fiber 40 and increase optical coupling efficiency between laser oscillator 10 and transmission fiber 40 to suppress output drop of laser beam 70.

Effects and Others

As described above, it is preferable that the lens driving unit moves the condenser lens along the traveling direction of the laser beam from a predetermined position during laser oscillation in an intermittent oscillation period in which the laser oscillator intermittently repeats laser oscillation, and returns the condenser lens to the predetermined position in a predetermined time period after stoppage of laser oscillation to reduce light intensity of the laser beam incident on the cladding through the intermittent oscillation period.

This configuration enables to stably reduce leak light in the transmission fiber also in a case where thermal expansion and contraction of the condenser lens is repeated due to intermittent laser oscillation.

Note that, in the first and second exemplary embodiments, although the thermal lens effect of condenser lens 21 is described as an example of causing the shift of the focal position of laser beam 70, the shift of the focal position can also occur due to another factor in actuality. For example, an incident angle or an incident beam diameter of laser beam 70 to condenser lens 21 may be changed due to, for example, the thermal lens effect due to thermal expansion of another optical component in beam synthesizer 12 and condenser lens unit 20, change of characteristics of laser beam 70 emitted from laser module 11, in particular, the laser diode with respect to temperature, and the like, to fluctuate the focal position of laser beam 70. Also in this case, the configurations illustrated in the first and second exemplary embodiments enable to compensate the shift of the focal position of laser beam 70 to reduce leak light in transmission fiber 40.

In the first and second exemplary embodiments, although a signal proportional to laser oscillation output included in the detection signal in reflection light monitor 23 is subtracted on the basis of the detection signal in output light monitor 14, the proportional signal may be obtained from an oscillation command value to subtract the proportional signal from the detection signal in reflection light monitor 23 as described above. In this case, lens movement controller 51 is allowed to generate a control signal to move slider 22 without using the detection signal in output light monitor 14 to adjust the position of condenser lens 21 on the basis of this control signal.

INDUSTRIAL APPLICABILITY

The laser device according to the present disclosure can reduce leak light in the transmission fiber to suppress laser beam output drop and damage of the transmission fiber, so that it is useful to apply the laser device according to the present disclosure to a laser processing device and the like that each require a laser beam of high output.

REFERENCE MARKS IN THE DRAWINGS 10 laser oscillator
11 laser module
12 beam synthesizer
13 partially transmissive mirror
14 output light monitor
20 condenser lens unit
21 condenser lens
22 slider
23 reflection light monitor
24 connector
25 quartz block
30 laser beam emission head
40 transmission fiber
41 core
42 cladding
44 laser beam incident part
45 mode stripper
46 laser beam incident end face of transmission fiber 40
50 controller
51 lens movement controller
60 housing
70 laser beam
71 spot
80 lens driving unit
100 laser device

The invention claimed is:

1. A laser device comprising:
a laser oscillator that generates a laser beam;
a condenser lens that condenses the laser beam emitted from the laser oscillator;
a transmission fiber including at least (i) a core that transmits a part of the laser beam condensed by the condenser lens and (ii) a cladding provided around the core;
a lens driving unit that automatically adjusts a position of the condenser lens to reduce a first light intensity of a first part of the laser beam incident on the cladding; and
a reflection light monitor that detects a second light intensity of a second part of the laser beam when the laser beam is incident on a laser beam incident part of the transmission fiber, the second light intensity including a third light intensity of a third part of the laser beam reflected or scattered at the laser beam incident part, wherein
the lens driving unit adjusts the position of the condenser lens so as to reduce the second light intensity detected by the reflection light monitor,
the second light intensity detected by the reflection light monitor includes a fourth light intensity of a fourth part of the laser beam detected in proportional to output of the laser beam emitted from the laser oscillator,
the laser device further comprises an output light monitor that detects fifth light intensity of a fifth part of the laser beam emitted from the laser oscillator, and
the lens driving unit calculates the fourth light intensity detected in proportional to the output of the laser beam emitted from the laser oscillator based on the fifth light intensity detected by the output light monitor, and adjusts the position of the condenser lens so as to reduce a sixth light intensity obtained by subtracting the calculated fourth light intensity from the second light intensity detected by the reflection light monitor.

2. The laser device according to claim 1, wherein the lens driving unit adjusts the position of the condenser lens so as to compensate a shift of a focal position of the laser beam due to thermal lens effect due to temperature rise in the laser device.

3. The laser device according to claim 1, wherein the laser oscillator includes a plurality of laser modules that emits laser beams having different wavelengths with each other, and
a beam synthesizer that synthesizes a plurality of laser beams having different wavelengths with each other emitted from the plurality of laser modules to emit one laser beam.

4. A laser device comprising:
a laser oscillator that generates a laser beam;
a condenser lens that condenses the laser beam emitted from the laser oscillator;
a transmission fiber including at least (i) a core that transmits a part of the laser beam condensed by the condenser lens and (ii) a cladding provided around the core; and
a lens driving unit that automatically adjusts a position of the condenser lens so as to reduce a first light intensity of a first part of the laser beam incident on the cladding, wherein
the lens driving unit moves the condenser lens along a traveling direction of the laser beam from a predetermined position during laser oscillation in an intermittent oscillation period in which the laser oscillator intermittently repeats the laser oscillation, and returns the condenser lens to the predetermined position in a predetermined time period after stoppage of the laser oscillation to reduce the first light intensity of the laser beam incident on the cladding through the intermittent oscillation period.

\* \* \* \* \*